United States Patent
Benisch et al.

(10) Patent No.: US 12,523,478 B2
(45) Date of Patent: Jan. 13, 2026

(54) MAP DATA COMPRESSION METHODS IMPLEMENTING MACHINE LEARNING

(71) Applicant: Woven by Toyota, Inc., Tokyo (JP)

(72) Inventors: Michael J. Benisch, Menlo Park, CA (US); James J. Kuffner, Vancouver, WA (US)

(73) Assignee: Woven By Toyota, Inc., Tokyo (JP)

( * ) Notice: Subject to any disclaimer, the term of this patent is extended or adjusted under 35 U.S.C. 154(b) by 397 days.

(21) Appl. No.: 17/965,329

(22) Filed: Oct. 13, 2022

(65) Prior Publication Data
US 2024/0125605 A1    Apr. 18, 2024

(51) Int. Cl.
*G01C 21/32*    (2006.01)
*G06F 16/29*    (2019.01)

(52) U.S. Cl.
CPC .............. *G01C 21/32* (2013.01); *G06F 16/29* (2019.01)

(58) Field of Classification Search
CPC ................................ G01C 21/32; G06F 16/29
See application file for complete search history.

(56) References Cited

U.S. PATENT DOCUMENTS

| | | | |
|---|---|---|---|
| 10,621,451 B1 | 4/2020 | Furman et al. | |
| 11,209,548 B2 | 12/2021 | Yang et al. | |
| 11,379,705 B2 | 7/2022 | Ambeck-Madsen et al. | |
| 2020/0116865 A1* | 4/2020 | Yang | G06V 20/588 |
| 2020/0160151 A1* | 5/2020 | Urtasun | G06N 20/00 |
| 2021/0279640 A1* | 9/2021 | Tu | G06V 10/82 |
| 2022/0172484 A1 | 6/2022 | Yonekawa | |
| 2022/0182498 A1 | 6/2022 | Singh et al. | |
| 2023/0004801 A1* | 1/2023 | Farabet | G06F 18/24133 |

OTHER PUBLICATIONS

Intellias. The Way of Data: How Sensor Fusion and Data Compression Empower Autonomous Driving (https://intellias.com/the-way-of-data-how-sensor-fusion-and-data-compression-empower-autonomous-driving/), Apr. 30, 2020, 12 pgs.

* cited by examiner

*Primary Examiner* — Brent Johnston Hoover
(74) *Attorney, Agent, or Firm* — Dinsmore & Shohl LLP

(57) ABSTRACT

Aspects of the present disclosure provide techniques for training a machine-learning model to compress map data for use online by an autonomous vehicle and techniques for compressing map data using the trained machine-learning model. A system includes a computing device configured to deploy a simulation environment initiating an instance of a virtual vehicle, execute iterations of a simulation of the virtual vehicle, wherein each iteration: deploys a set of map data compressed by the machine-learning compression model and causes the virtual vehicle to execute control operations based on the deployed set of map data, evaluate performance of the executed control operations by the virtual vehicle based on the compressed map data for each iteration, and train the machine-learning compression model to compress map data such that the evaluated performance of the executed control operations by the virtual vehicle exceeds a performance threshold.

16 Claims, 5 Drawing Sheets

MAP DATA COMPRESSION METHODS IMPLEMENTING MACHINE LEARNING

TECHNICAL FIELD

The present disclosure relates to systems, methods, and computer implemented programs for training a machine-learning compression model to compress map data for use online by an autonomous vehicle and systems, methods, and computer implemented programs for compressing map data using the trained machine-learning compression model.

BACKGROUND

Data compression of a data file is the reduction in the number of bits needed to represent data. A compressed data file requires less volume of memory for storage than an uncompressed data file and can be transferred between locations in less time than the uncompressed data file version. Once a compressed data file is received by a destination system and/or extracted for use by a system, the compressed data file is decompressed. However, the process of compressing and decompressing data files in an inherently lossy process. Moreover, available compression techniques indiscriminately compress data files. That is, compression techniques do not take into account whether portions of the data file are more critical than others when carrying out compression of the data file.

Accordingly, a need exists for data compression techniques that do not indiscriminately compress data and more specifically intelligently compress data files to preserve performance of such data when utilized for predefined tasks.

SUMMARY

In an embodiment, a system for training a machine-learning model to compress map data for use online by a vehicle includes a computing device. The computing device is configured to deploy a simulation environment initiating an instance of a virtual vehicle and execute iterations of a simulation of the virtual vehicle, where each iteration: deploys a set of map data compressed by the machine-learning compression model and causes the virtual vehicle to execute control operations based on the deployed set of map data. The computing device is further configured to evaluate performance of the executed control operations by the virtual vehicle based on the compressed map data for each iteration and train the machine-learning compression model to compress map data such that the evaluated performance of the executed control operations by the virtual vehicle exceeds a performance threshold.

In some embodiments, a method for training a machine-learning model to compress map data for use online by a vehicle is disclosed. The method includes deploying, with a computing device, a simulation environment initiating an instance of a virtual vehicle; executing, with the computing device, iterations of a simulation of the virtual vehicle, where each iteration: deploys a set of map data compressed by the machine-learning compression model and causes the virtual vehicle to execute control operations based on the deployed set of map data; evaluating, with the computing device, performance of the executed control operations by the virtual vehicle based on the compressed map data for each iteration; and training, with the computing device, the machine-learning compression model to compress map data such that the evaluated performance of the executed control operations by the virtual vehicle exceeds a performance threshold.

In some embodiments, a method for compressing map data includes receiving, with a computing device, uncompressed map data, implementing, with the computing device, a machine-learning compression model, where the machine-learning compression model is trained in response to an evaluated performance of a virtual vehicle subjected to iterations of a simulation of the virtual vehicle, wherein each iteration deploys a set of map data compressed by the machine-learning compression model and causes the virtual vehicle to execute control operations based on the deployed set of map data, compressing the uncompressed map data with the machine-learning compression model, and outputting a compressed map data for use online by a vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
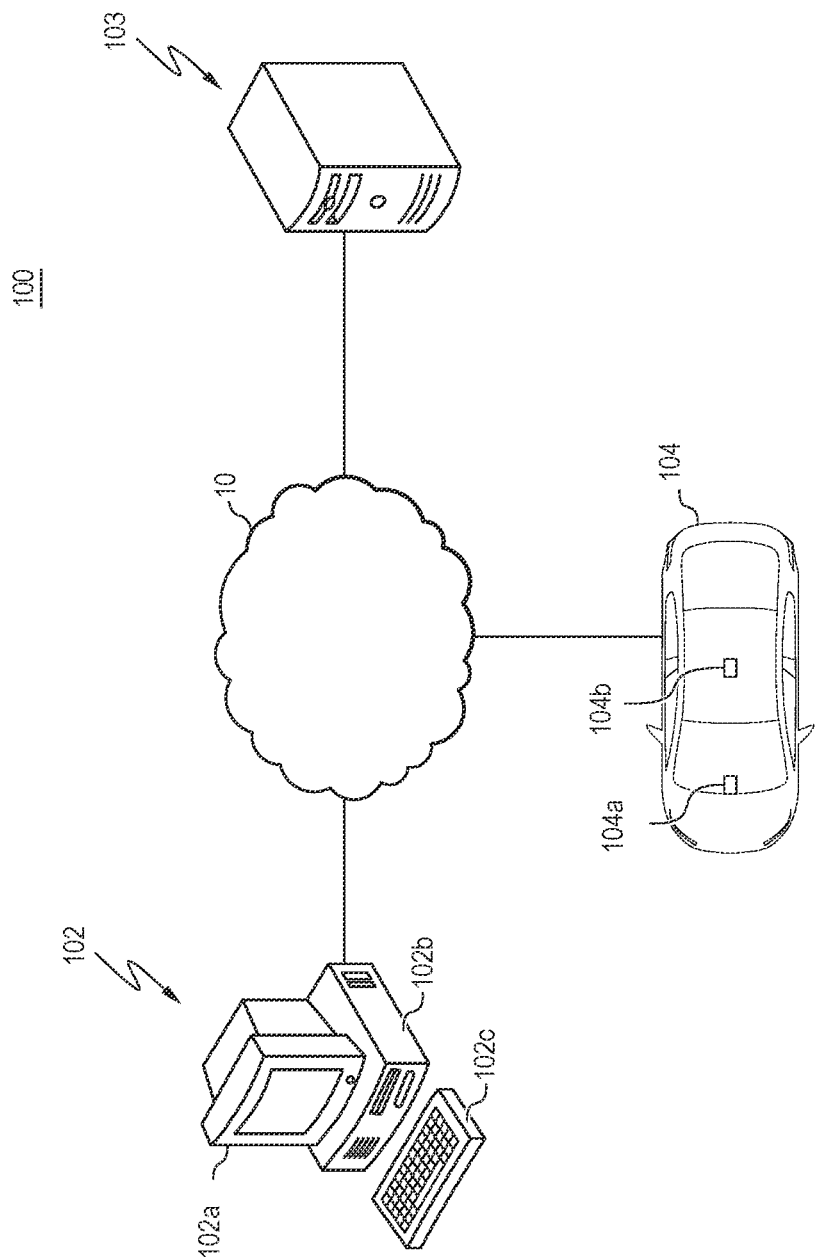
FIG. 1 schematically depicts an illustrative system, according to one or more embodiments shown and described herein.

Embodiments of the present disclosure include systems, methods, and computer implemented programs for training a machine-learning model to compress map data for use online by an autonomous vehicle and systems, methods, and computer implemented programs for compressing map data using the trained machine-learning model. For example and without limitation, the present disclosure includes methods of compressing map data for transfer to and/or from and storage in low volume storage devices, such as a storage volume of vehicle's electronic control unit (ECU). More specifically, the compressed map data may be utilized by an ECU to support autonomous and/or semi-autonomous vehicle functionality. While the present disclosure describes data compression methods and systems with reference to map data as the data file type and vehicle utilization of the map data, it is understood that the methods and systems can be implemented for compression of other types of data files and where the compression methods are tailored to utilization tasks other than by a vehicle ECU.

As described in more detail herein, the machine learning models for compressing data include identifying salient features of map data with respect to an autonomous vehicle system through simulation processes. In embodiments, once salient feature are identified, the machine-learning compression model may be trained to preserve the salient features thereby intelligently reducing the density and/or size of the map data based on identification of the salient features. In applying the learned machine learning compression model to compress map data, map data can be compressed and stored locally on a vehicle ECU and/or efficiently transferred to a vehicle for use. For instance, map data needs to be available locally on the vehicle ECU and easily updatable through transmission to the vehicle. However, map data that is needed to support some autonomous and/or semi-autonomous operation is currently very large and can be difficult to store in an uncompressed form or readily transferred in raw uncompressed format to the vehicle ECU. Accordingly, the present disclose provides methods for compressing the map data using machine learning techniques that are trained to preserve aspects of the map data necessary for supporting specific tasks such as autonomous and/or semi-autonomous vehicle operations.

Map data utilized by autonomous vehicle systems includes a variety of data types. In some instances, map data may be visual feature based map data, polyline representations of environments, geometric maps, geospatial data of an environment, and the like. The map data may further include connectivity parameters defining how features with the map data relate, such as a stop light and lane correspondence, a lane of travel and turns or splits therefrom, types of lanes, for example, a traveling lane, a turning lane, a merging lane, an exit or entrance ramp lane, or the like. Each of the map data include numerous features that can be utilized by autonomous vehicle systems, but some autonomous vehicle systems may be capable of effectively operating without the density of information for particular aspects, for example, environmental features such as well-defined trees or buildings. The compression of such features is executed in a manner that does not fully preserve those features as compared to more important features to an autonomous vehicle system such as lane boundaries or traffic signals/stop signs.

Embodiments include training the machine learning compression model through simulations of a virtual vehicle system, such as an autonomous and/or semi-autonomous system. For example, to guide the search for the best model a fitness function based on the performance of the virtual vehicle system in a simulation may be utilized. Such a method includes creating a simulation environment where the performance of the autonomous vehicle system is evaluated. Multiple sets of map data, compressed using various compression models, are implemented in the simulation to simulate the virtual vehicle's performance implementing the map data. The multiple map data includes map data that is compressed or otherwise manipulated to excluded or de-densify aspects of the map data. The results of the simulations and full resolution maps are fed through a machine-learning compression model to learn how to compress the map data while preserving performance of the virtual vehicle system. When new compressed versions of the map data are generated, they may be validated through the simulation process. The training loop continues until the machine learning compression model learns to generate map data that meets predefined threshold parameters such as a predefined compression ratio and/or performance values of the virtual vehicle system under simulation.

In some embodiments, the training and learning loops using the simulation process identify proxy signals and/or proxy measures that are good indicators that the compressed map data will result in good autonomous vehicle system performance. For example, the accuracy of the lane boundaries in a compressed map data may correlate to good autonomous vehicle system performance. Therefore, when the accuracy of the lane boundaries is equal or greater to a predefined degree of accuracy, then confidence that the compressed map data will result in good autonomous vehicle system performance may be attained without needing to test it in a simulation. In this way, additional simulations may not be needed for map data compressions that include identified proxies.

In some embodiments, training of the machine learning compression model may not require a simulation process. Instead, proxy signals may be defined and input into the machine learning compression model with the full resolution map data. The machine learning compression model may then learn to compress aspects of the map data while maintaining the proxy signals and striving to meet the goal of a compression ratio or a predetermined file size of the compressed map data. As noted above, the proxy signals may be identified through the simulation process or predetermined based on expertise of the autonomous vehicle system. For example, proxy signals may define the accuracy of particular aspects of the map data such as the accuracy of or detail corresponding to traffic signals and/or signs, lane connectivity, lane boundaries, or the like. The accuracy may be the accuracy of the reconstructed map data from a compressed map data compared to the full resolution map data. Additionally, identification of any dropped or missing elements resulting from the reconstruction of useable map data from the compressed map data may be implemented as another indicator of a poor compression method.

The machine learning compression model is trained to decrease the size of the map data. However, the machine learning compression model may further be trained to optimize the efficiency in which the compressed map data may be decompressed and implemented for use by resources available by the vehicle ECU. That is, compression of map data may be performed offline and may be completed without time or computing resource constraints. However, the compressed map data needs to be readily available for use in a vehicle. Accordingly, the machine learning compression model is also trained to assure that decompression of the compressed map data can be achieved online by a vehicle ECU in a predetermined amount of time and/or with the available resources of the vehicle ECU.

Furthermore, the machine learning compression model may implement a one or more different compression algorithms or portions thereof as the map data may be made up of various data structures such as images, polyline representations, geometric maps, and the like.

Turning now to the drawings, the systems, methods, and computer implemented programs for training a machine-learning model to compress map data for use online by an autonomous vehicle and for compressing map data using the trained machine-learning model are now described.

Referring to FIG. 1, an illustrative embodiment of a system 100 for training a machine learning compression model and/or deploying compressed map data to devices, such as a vehicle for utilization is depicted. The system 100 depicted in FIG. 1 includes a computing device 102, a server 103, and a vehicle 104 connected to each other via a network 10. As illustrated in FIG. 1, the network 10 may include a wide area network, such as the internet, a local area network (LAN), a mobile communications network, a public service telephone network (PSTN) and/or other network and may be configured to electronically connect a computing device 102, a server 103, and/or a vehicle 104.

The computing device 102 may include a display 102a, a processing unit 102b and an input device 102c, each of which may be communicatively coupled to together and/or to the network 10. The server 103 may be configured to include similar components as the computing device 102. As described in more detail herein, the computing device 102 and/or the server 103 are configured to train a machine-learning compression model to compress map data and further utilize a trained machine-learning compression model to compress map data for transferring to a device such as a vehicle 104 for implementation by one or more vehicle systems.

In some embodiments, the computing device 102 may also be utilized to interface with the artificial intelligence model, such as the machine-learning compression model to update or reconfigure the operation of the system 100. Furthermore, the server 103 may maintain map data, compressed map data, machine-learning compression models, and the like. The server 03 may also be configured to perform operations described herein with reference to the computing device 102.

It should be understood that while the computing device 102, the server 103, and the electronic control unit 104a (also referred to herein as the vehicle ECU) of the vehicle 104 may be a personal computer, a micro controller, or the like. Additionally, while each of the computing devices illustrated in FIG. 1 are depicted as single pieces of hardware, this is also an example. More specifically, each of the computing device 102, the server 103, and electronic control unit 104a may represent a plurality of computers, servers, databases, and the like.

The vehicle 104 includes an electronic control unit 104a and a communications unit 104b. The electronic control unit 104a may be any device or combination of components comprising a processor and non-transitory computer readable memory. The processor may be any device capable of executing the machine-readable instruction set stored in the non-transitory computer readable memory. Accordingly, the processor may be an electric controller, an integrated circuit, a microchip, a computer, or any other computing device. The processor is communicatively coupled to the other components of the vehicle 104 by a communication bus. Accordingly, the communication bus may communicatively couple any number of processors with one another, and allow the components coupled to the communication bus to operate in a distributed computing environment. Specifically, each of the components may operate as a node that may send and/or receive data. It is further noted that the processor may comprise a single processor, multiple processors, or a system of processors.

The communications unit 104b of the vehicle 104 may include network interfaces for one or more of a plurality of different networks, protocols, or the like. For instance, the communications unit 104b may include one or more antennas (e.g., many in/many out (MIMO) antennas, etc.) that may allow for communication via Wi-Fi networks, IrDA, Bluetooth, Wireless USB, Z-Wave, ZigBee, near field communication (NFC), LTE, WiMAX, UMTS, CDMA, C-V2X, GSM interfaces may include Wi-Fi, xth generation cellular technology (e.g., 2G, 3G, 4G, 5G, etc.), WCDMA, LTE Advanced, or the like.

The electronic control unit 104a is configured to implement one or more autonomous and/or semi-autonomous systems such as controlling the operation and navigation of the vehicle 104 using compressed map data that is compressed using the machine learned compression model described herein.

Figure 2:
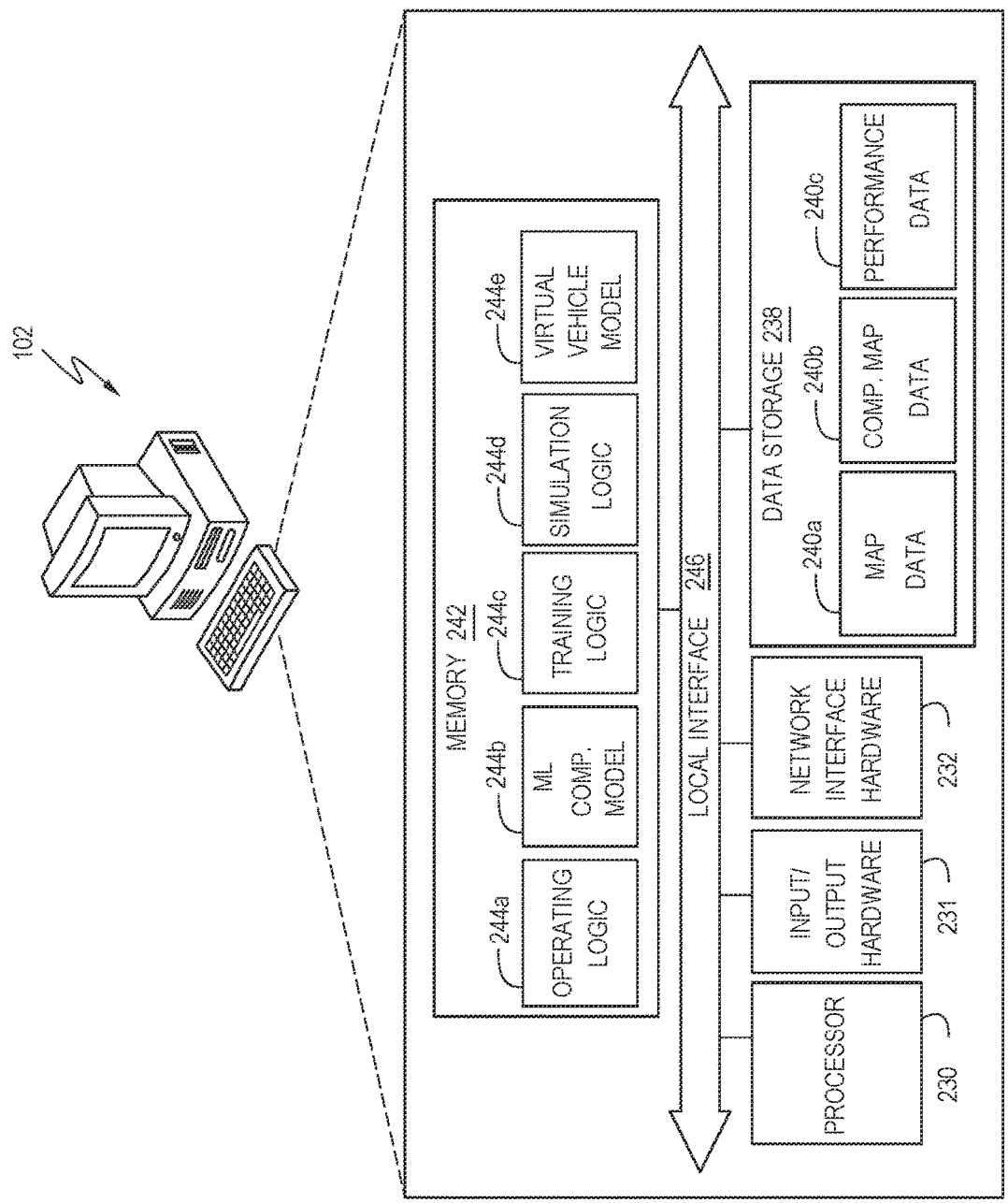
FIG. 2 schematically depicts an illustrative computing device, according to one or more embodiments shown and described herein.

FIG. 2 depicts an illustrative computing device 102. The computing device 102 may utilize hardware, software, and/or firmware, according to embodiments shown and described herein. While in some embodiments, the computing device 102 may be configured as a general-purpose computer with the requisite hardware, software, and/or firmware, in some embodiments, the server 103 may be configured as a special purpose computer designed specifically for performing the functionality described herein.

As illustrated in FIG. 2, the computing device 102 includes a processor 230, input/output hardware 231, network interface hardware 232, a data storage component 238, and a memory component 242.

The data storage component 238 stores uncompressed map data 240a, compressed mat data 240b, and performance data 240c, such as expected performance results and/or performance thresholds. For example, performance results and/or thresholds may provide indication as to whether the vehicle follows the rules of the road, maintains a lane of travel, avoids a collision, capable of navigating from a starting point to a destination, and/or the like. In embodiments, the data storage component 238 may include additional data sets utilized by the system 100. The memory component 242 includes operating logic 244a, a machine-learning compression model 244b, training logic 244c, simulation logic 244d, and one or more virtual vehicle models 244e (each of which may be embodied as a computer program, firmware, or hardware, as an example). The machine-readable memory (which may also be referred to as a non-transitory processor readable memory or medium) stores instructions which, when executed by the processor 230, causes the processor 230 to perform a method or control scheme as described herein. The memory component 242 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components.

Additionally, a local interface 246 is also included in FIG. 2 and may be implemented as a bus or other interface to facilitate communication among the components of the computing device 102.

The processor 230 may include any processing component(s) configured to receive and execute programming instructions (such as from the data storage component 238 and/or the memory component 242). The instructions may be in the form of a machine-readable instruction set stored in the data storage component 238 and/or the memory component 242. The input/output hardware 231 may include a monitor, keyboard, mouse, printer, microphone, speaker, and/or other device for receiving, sending, and/or presenting data. The network interface hardware 232 may include any wired or wireless networking hardware, such as a modem, LAN port, Wi-Fi card, WiMax card, mobile communications hardware, and/or other hardware for communicating with other networks and/or devices.

It should be understood that the data storage component 238 may reside local to and/or remote from the computing device 102 and may be configured to store one or more pieces of data for access by the computing device 102 and/or other components. As illustrated in FIG. 2, the data storage component 238 includes uncompressed map data 240*a*, compressed mat data 240*b*, and performance data 240*c*, such as expected performance results and/or performance thresholds.

The uncompressed map data 240*a* may include geospatial data of an environment. Geospatial data may include street data, building data, elevation data, vegetation data, integrated data, and the like. The geospatial data may be expressed as vector data, point cloud data, image data, or a combination thereof. The compressed map data 240*b* may be map data that is compressed using a machine-learning compression model as discussed herein. In embodiments, the compressed map data is map that is compressed to using one or more predetermined compression techniques to discriminately compress predefined features or aspects of the map data. In some embodiments, the predefined compressed map data may be utilized to train the machine-learning compression model to learn which features of the map data are beneficial to good performance of an autonomous and/or semi-autonomous vehicle system. To determine whether the compressed map data results in good performance of the autonomous and/or semi-autonomous vehicle system, a simulation of a virtual vehicle implementing the compressed map data is performed.

Figure 3:
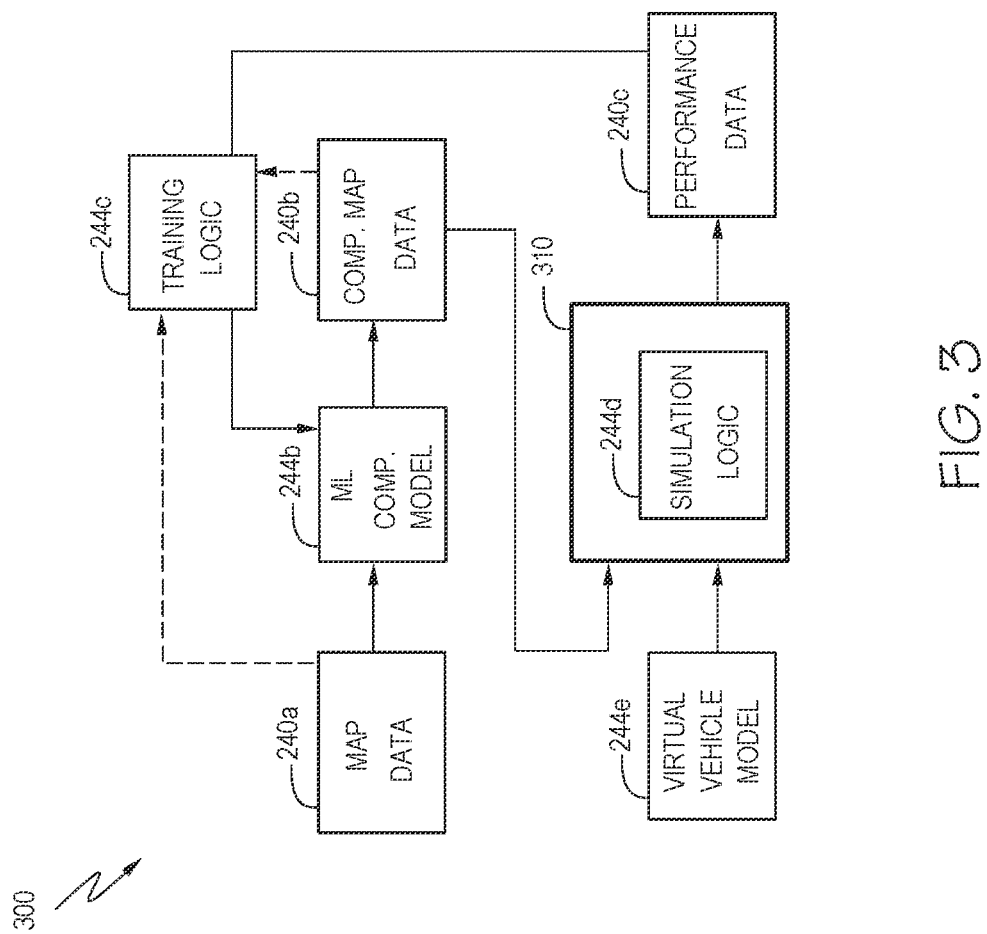
FIG. 3 depicts an illustrative block diagram of an illustrative implementation of the operations of the operating logic, machine-learning compression model, training logic, simulation logic, and one or more virtual vehicle models, according to one or more embodiments shown and described herein.

As noted above, the memory component 242 includes operating logic 244*a*, a machine-learning compression model 244*b*, training logic 244*c*, simulation logic 244*d*, and one or more virtual vehicle models 244*e* (each of which may be embodied as a computer program, firmware, or hardware, as an example). Various operations and functionality of the operating logic 244*a*, machine-learning compression model 244*b*, training logic 244*c*, simulation logic 244*d*, and one or more virtual vehicle models 244*e* will be described in more detail with reference to FIGS. 3-5. Referring to FIG. 3, a block diagram 300 of an illustrative implementation of the operations of the operating logic 244*a*, machine-learning compression model 244*b*, training logic 244*c*, simulation logic 244*d*, and one or more virtual vehicle models 244*e* is depicted. In some embodiments, a computing device 102 is configured to train the machine-learning compression model 244*b* utilizing a simulation environment 310.

The machine-learning compression model 244*b* may implement a variety of machine-learning (ML) or artificial intelligence (AI) models such as neural networks, and/or the like. The machine-learning compression model 244*b* may include be configured to implement one or more compression algorithms alone or in combination in whole or in part to form a trainable compression model.

The machine-learning compression model 244*b* may be trained and provided machine learning capabilities via a neural network as described herein. By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling. The one or more ANN models may employ a combination of artificial intelligence techniques, such as, but not limited to, Deep Learning, Random Forest Classifiers, Feature extraction from audio, images, clustering algorithms, or combinations thereof.

In some embodiments, a convolutional neural network (CNN) may be utilized. For example, a convolutional neural network (CNN) may be used as an ANN that, in a field of machine learning, for example, is a class of deep, feed-forward ANNs applied for audio-visual analysis of the captured disturbances. CNNs may be shift or space invariant and utilize shared-weight architecture and translation invariance characteristics. Additionally or alternatively, a recurrent neural network (RNN) may be used as an ANN that is a feedback neural network. RNNs may use an internal memory state to process variable length sequences of inputs to generate one or more outputs. In RNNs, connections between nodes may form a DAG along a temporal sequence. One or more different types of RNNs may be used such as a standard RNN, a Long Short Term Memory (LSTM) RNN architecture, and/or a Gated Recurrent Unit RNN architecture.

The machine-learning compression model 244*b* receives map data 240*a*. In some embodiments, the map data 240*a* may be in a compressed form or be in raw uncompressed form. The machine-learning compression model 244*b* compresses the map data 240*a* and generates compressed map data 240*b*. A simulation environment 310 is implemented with a computing device 102 that is enabled by the simulation logic 244*d*. The simulation environment 310 implements simulation logic 244*d* for deploying a virtual vehicle model 244*e* in an environment defined by the compressed map data 240*b*. The simulation environment 310 simulates the operation of a virtual vehicle defined by the virtual vehicle model 244*e*. The simulation environment 310 receives the compressed map data 240*b* and initiates the virtual vehicle based on the virtual vehicle model 244*e*. The virtual vehicle model 244*e* may initiate an instance of a virtual vehicle having one or more autonomous and/or semi-autonomous vehicle functions. The virtual vehicle model 244*e* may further initiate models for a powertrain, navigation control, and/or other systems of a vehicle 104. The simulation logic 244*d* simulates operation of the virtual vehicle with the compressed map data 240*b*. The compressed map data 240*b* may be decompressed by the virtual vehicle's electronic control unit and implemented to support operation the one or more autonomous and/or semi-autonomous vehicle functions. In operation on a real-world vehicle 104, the ECU 104*a* may also decompress the compressed map data 240*b* for implementation by one or more of the systems of the vehicle 104.

As the simulation is executed by the computing device 102 (or the server 103), the performance of the virtual vehicle based on the compressed map data implemented in the simulation environment is evaluated generating performance data 240*c*. In some embodiments, performance data 240*c* is output from the simulation environment 310. The computing device 102, through implementation of training logic 244c evaluates the performance data 240. An evaluation of the performance data 240 generates a determination as to whether the virtual vehicle's driving behaviors meets one or more predetermined performance threshold ranges. In some embodiments, evaluation of the performance data 240c is conducted in combination with a comparison of the differences between the map data 240a and the compressed map data 240b to determine one or more proxy signals corresponding to aspects of the compressed map data 240b. The aforementioned evaluation associates determined select ones of the one or more proxy signals that enable the virtual vehicle to meet or exceed one or more predetermined performance thresholds (or threshold ranges). The training logic 244c is configured to further train the machine-learning compression model 244b to preserve the identified one or more proxy signals that enable the virtual vehicle to meet or exceed one or more predetermined performance thresholds (or threshold ranges). As used herein, the one or more proxy signals refer to aspects of map data such as smoothness of lane geometry, error or accuracy (lossy) from compressed to uncompressed data, intersection positioning, sign positioning, and/or other features that effect performance of the virtual vehicle under simulation. The computing device 102 may iteratively execute a series of simulations in response to updates made to the machine-learning compression model 244b until, for example, each of the one or more predefined performance threshold (or threshold ranges) is achieved in a simulation environment 310. In some instances, training of the machine-learning compression model 244b may be continued until the compressed map data 240b meets a predefined compressed data file size (e.g., a predefined number of bits). In some embodiments, other parameters of the compressed map data 240b, such as the amount of time and/or resources required to decompress the compressed map data 240b utilizing the electronic control unit 104a of the vehicle 104 meeting predetermined values may be implemented to determine whether additional training is needed.

Figure 4:
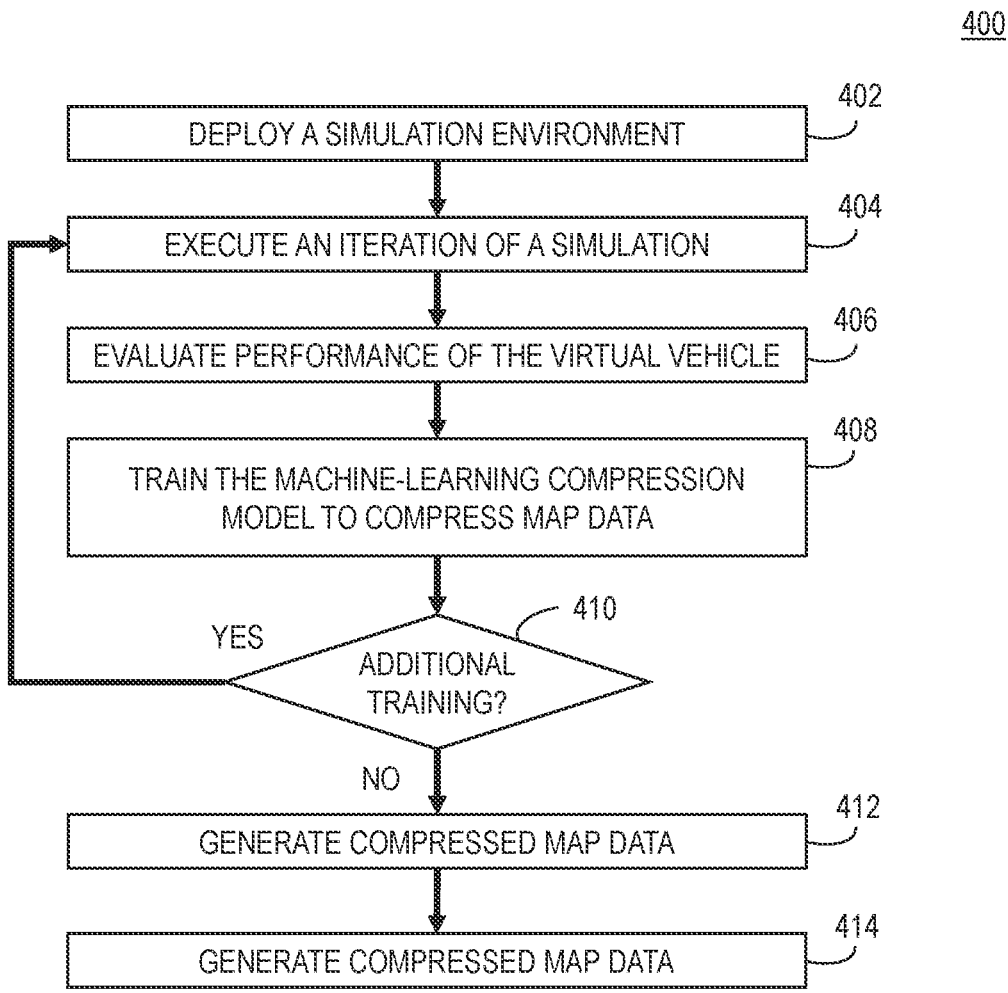
FIG. 4 depicts a flow chart of an illustrative method for training the machine-learning compression model to compress map data, according to one or more embodiments shown and described herein.

Turning to FIG. 4 a flow chart of an illustrative method for training the machine-learning compression model to compress map data for use online by an autonomous vehicle is depicted. The method for training the machine-learning compression model will be described as being implemented with a computing device 102. At block 402, the computing device 102 implements simulation logic 244d and a virtual vehicle model 244e. Implementation of the simulation logic 244d causes a simulation environment to be deployed that initiates an instance of a virtual vehicle based on the virtual vehicle model 244e. At block 404, the computing device 102 executes iterations of a simulation of the virtual vehicle. Each iteration deploys a set of map data compressed by the machine-learning compression model and causes the virtual vehicle to execute control operations based on the deployed set of map data. For example, the virtual vehicle under simulation may be configured to navigate from a starting point to a destination. The virtual vehicle under simulation executes operations based on the compressed map data implemented in the simulation environment. The execution of the simulation can generate performance data for evaluation of the virtual vehicle's performance.

At block 406, the computing device 102 evaluates the performance of the executed control operations executed by the virtual vehicle based on the compressed map data for each iteration. An evaluation of the performance data 240 generates a determination as to whether the virtual vehicle's driving behaviors meets one or more predetermined performance threshold ranges. In some embodiments, evaluation of the performance data 240c is conducted in combination with a comparison of the differences between the map data 240a and the compressed map data 240b to determine one or more proxy signals corresponding to aspects of the compressed map data 240b. The aforementioned evaluation associates determines select ones of the one or more proxy signals that enable the virtual vehicle to meet or exceed one or more predetermined performance thresholds (or threshold ranges). The training logic 244c is configured to further train the machine-learning compression model 244b to preserve the identified one or more proxy signals that enable the virtual vehicle to meet or exceed one or more predetermined performance thresholds (or threshold ranges). For example, the one or more predetermined performance thresholds may include whether the virtual vehicle maintained a lane of travel, completed a trip within a predefined amount of time, did not violate any rules of the road such as travelling at a defined speed, followed traffic signs and signals, was capable of discerning navigation signs, and/or the like.

At block 408, the computing device 102 utilizes the evaluated performance of the virtual vehicle based on the compressed map data 240b to train the machine-learning compression model 244b. For example, the computing device 102 trains the machine-learning compression model 244b to compress map data such that the evaluated performance of the executed control operations by the virtual vehicle exceeds a performance threshold. The training operation may include adjusting the compression algorithm and/or updating relevant aspects of map data such that the machine-learning compression model 244b learns to treat the relevant aspects of the map data to preserve performance of the vehicle and/or the presence of proxy signals in the map data.

At block 410, the computing device 102 determines whether the additional training of the machine-learning compression model 244b requires further training. The determination may be based one or more of the aforementioned criteria. If, at block 410, the computing device 102 determines "YES" additional training is needed, the process returns to block 404 where an additional iteration of simulation and training are performed. In some embodiments, noise is added to the compressed map data input to the simulation or other adjustments are made to the machine-learning compression model 244b to generate an updated compressed map data 240b for use in the simulation. If, at block 410, the computing device determines "NO" additional training is needed, then the process proceeds to block 412. At block 412, the computing device 102 may generate compressed map data utilizing the trained machine-learning compression model 244b. The compressed map data 240b may be stored in the data storage component 238 of the computing device 102 or the server 103. At block 414, the computing device causes the compressed map data 240b to be transmit to a vehicle 104.

Figure 5:
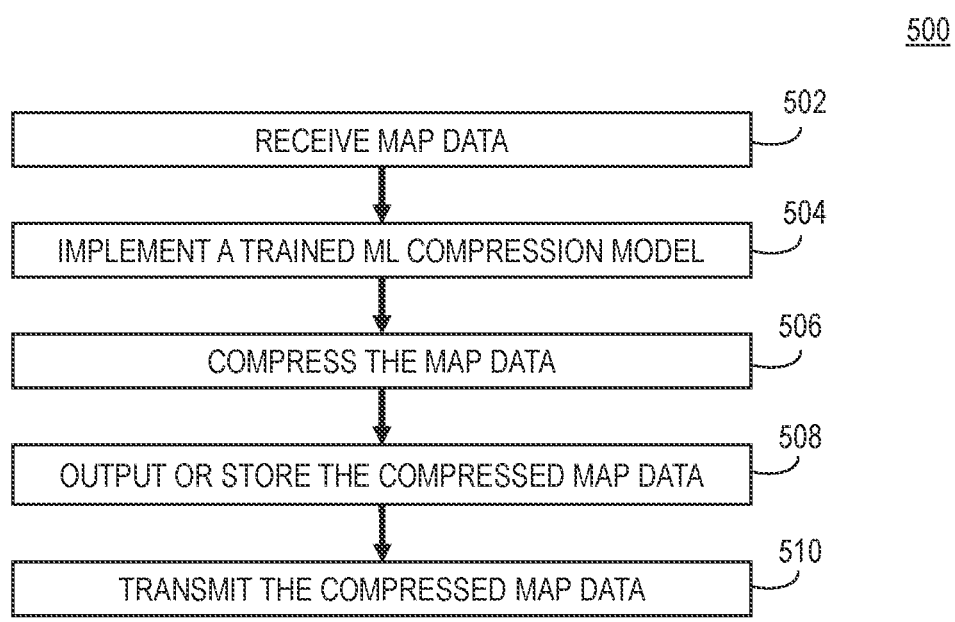
FIG. 5 depicts an illustrative method for generating compressed map data utilizing a trained machine-learning compression model, according to one or more embodiments shown and described herein.

Turning to FIG. 5 a flow chart 500 of an illustrative method for generating compressed map data 240b utilizing a trained machine-learning compression model 244b. At block 502, the computing device 102 receives uncompressed map data 240a. At block 504, the computing device 102 implements a machine-learning compression model 244b. In embodiments, the machine-learning compression model 244b may be trained as described herein. For example, the machine-learning compression model 244b is trained in response to an evaluated performance of a virtual vehicle subjected to iterations of a simulation of the virtual vehicle. As described herein, each iteration deploys a set of map data compressed by the machine-learning compression model 244*b* and causes the virtual vehicle to execute control operations based on the deployed set of map data. At block 506, the computing device 102 compresses the uncompressed map data with the trained machine-learning compression model 244*b*. The generated compressed map data 240*b*, at block 508, is output for use by a vehicle 104. In some embodiments, outputting the generated compressed map data 240*b* may include storing the same in a data storage component 238. Furthermore, at block 510, in some embodiments, the computing device causes the compressed map data 240*b* to be transmit to a vehicle 104.

The functional blocks and/or flowchart elements described herein may be translated onto machine-readable instructions. As non-limiting examples, the machine-readable instructions may be written using any programming protocol, such as: (i) descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It should now be understood that the systems, methods, and non-transitory mediums (computer program products) described herein relate to techniques for training a machine-learning model to compress map data for use online by an autonomous vehicle and techniques for compressing map data using the trained machine-learning model.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for training a machine-learning compression model to compress map data for use online by a vehicle, the system comprising:
   a computing device configured to:
   deploy a simulation environment initiating an instance of a virtual vehicle,
   execute iterations of a simulation of the virtual vehicle, wherein each iteration: deploys a set of map data compressed by the machine-learning compression model and causes the virtual vehicle to execute control operations based on the deployed set of compressed map data, and wherein each iteration implements the machine-learning compression model that is iteratively evaluated and trained until the machine-learning compression model learns to compress the set of map data such that a performance of the virtual vehicle under simulation exceeds a performance threshold,
   evaluate performance of the executed control operations by the virtual vehicle based on the compressed map data for each iteration, and
   train the machine-learning compression model to compress map data such that the evaluated performance of the executed control operations by the virtual vehicle exceeds the performance threshold.

2. The system of claim 1, wherein the computing device is further configured to train the machine-learning compression model by:
   identifying one or more proxy signals corresponding to aspects of the compressed map data based on the evaluated performance of the virtual vehicle, and
   causing the training of the machine-learning compression model to preserve the one or more identified proxy signals when compressing map data.

3. The system of claim 2, wherein the one or more identified proxy signals comprises at least one of a smoothness of lane geometry, intersection positioning, or sign positioning.

4. The system of claim 1, wherein the computing device is further configured to:
   execute iterations of the simulation of the virtual vehicle, wherein each subsequent iteration deploys an updated compressed map data based on training revisions made to the machine-learning compression model.

5. The system of claim 1, wherein the computing device is further configured to:
   generate compressed map data with a trained machine-learning compression model; and
   transmit the generated compressed map data to the vehicle.

6. The system of claim 1, wherein the instance of the virtual vehicle deployed in the simulation environment comprises at least one autonomous vehicle system.

7. The system of claim 1, wherein the instance of the virtual vehicle deployed in the simulation environment comprises at least one semi-autonomous vehicle system.

8. The system of claim 1, wherein the set of map data comprises geospatial data.

9. A method for training a machine-learning compression model to compress map data for use online by a vehicle, the method comprising:

deploying, with a computing device, a simulation environment initiating an instance of a virtual vehicle;

executing, with the computing device, iterations of a simulation of the virtual vehicle, wherein each iteration: deploys a set of map data compressed by the machine-learning compression model and causes the virtual vehicle to execute control operations based on the deployed set of compressed map data, and wherein each iteration implements the machine-learning compression model that is iteratively evaluated and trained until the machine-learning compression model learns to compress the set of map data such that a performance of the virtual vehicle under simulation exceeds a performance threshold;

evaluating, with the computing device, performance of the executed control operations by the virtual vehicle based on the compressed map data for each iteration; and training, with the computing device, the machine-learning compression model to compress map data such that the evaluated performance of the executed control operations by the virtual vehicle exceeds the performance threshold.

10. The method of claim 9, wherein training the machine-learning compression model further comprises:

identifying one or more proxy signals corresponding to aspects of the compressed map data based on the evaluated performance of the virtual vehicle; and causing the training of the machine-learning compression model to preserve the one or more identified proxy signals when compressing map data.

11. The method of claim 10, wherein the one or more identified proxy signals comprises at least one of a smoothness of lane geometry, intersection positioning, or sign positioning.

12. The method of claim 9, wherein:

each subsequent iteration of the simulation deploys an updated compressed map data based on training revisions made to the machine-learning compression model.

13. The method of claim 9, further comprising:

generating compressed map data with a trained machine-learning compression model; and transmitting the generated compressed map data to the vehicle.

14. The method of claim 9, wherein the instance of the virtual vehicle deployed in the simulation environment comprises at least one autonomous vehicle system.

15. The method of claim 9, wherein the instance of the virtual vehicle deployed in the simulation environment comprises at least one semi-autonomous vehicle system.

16. The method of claim 9, wherein the set of map data comprises geospatial data.

* * * * *